United States Patent
Kennedy, Jr. et al.

(10) Patent No.: US 7,925,205 B2
(45) Date of Patent: Apr. 12, 2011

(54) SYSTEM AND METHOD OF OPERATION FOR NETWORK OVERLAY GEOLOCATION SYSTEM WITH REPEATERS

(75) Inventors: Joseph P. Kennedy, Jr., Great Falls, VA (US); John Peter Carlson, Dulles, VA (US); Thomas B. Gravely, Herndon, VA (US); Andrew Beck, Ashburn, VA (US)

(73) Assignee: Andrew LLC, Hickory, NC (US)

( * ) Notice: Subject to any disclaimer, the term of this patent is extended or adjusted under 35 U.S.C. 154(b) by 987 days.

(21) Appl. No.: 10/550,213

(22) PCT Filed: Sep. 17, 2004

(86) PCT No.: PCT/US2004/030781
§ 371 (c)(1),
(2), (4) Date: Oct. 5, 2006

(87) PCT Pub. No.: WO2005/029878
PCT Pub. Date: Mar. 31, 2005

(65) Prior Publication Data
US 2007/0129085 A1 Jun. 7, 2007

Related U.S. Application Data

(60) Provisional application No. 60/503,490, filed on Sep. 17, 2003.

(51) Int. Cl.
*H04B 7/15* (2006.01)
(52) U.S. Cl. ...................................... 455/11.1; 370/315
(58) Field of Classification Search .................. 455/456, 455/456.2, 11.1, 13.4; 370/315
See application file for complete search history.

(56) References Cited

U.S. PATENT DOCUMENTS

| 4,783,744 A | 11/1988 | Yueh |
| 5,317,323 A | 5/1994 | Kennedy, Jr. et al. |
| 5,465,289 A | 11/1995 | Kennedy, Jr. et al. |

(Continued)

FOREIGN PATENT DOCUMENTS

JP 60-347529 12/1994

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner* — Nay A Maung
*Assistant Examiner* — Angelica M Perez
(74) *Attorney, Agent, or Firm* — Duane Morris, LLP

(57) ABSTRACT

A novel system and method for a network overlay geolocation system operating in a host wireless communication system with repeaters is disclosed. Embodiments of the novel system and method enable wireless communication system to determine if signals being received by system receivers arrive directly from a target mobile appliance or if the signals are passing through a repeater. The system's determination may be based at least in part on the TA of the signal, the power of the received signal, the power of the transmitted signal, the hearabiltiy of the signal at system receivers, the hearabiltiy of system transmitters at the mobile and the known delays associated with the repeaters. Embodiments of the novel system and method provide a more accurate geolocation of mobiles served by repeater stations than capable in the prior art.

7 Claims, 6 Drawing Sheets

U.S. PATENT DOCUMENTS

| | | | |
|---|---|---|---|
| 5,506,863 | A | 4/1996 | Meidan |
| 5,600,706 | A | 2/1997 | Dunn et al. |
| 5,870,029 | A | 2/1999 | Otto et al. |
| 5,973,643 | A | 10/1999 | Hawkes et al. |
| 6,144,711 | A | 11/2000 | Raleigh et al. |
| 6,188,351 | B1 | 2/2001 | Bloebaum |
| 6,212,391 | B1 | 4/2001 | Saleh et al. |
| 6,295,455 | B1 | 9/2001 | Fischer et al. |
| 6,311,043 | B1 | 10/2001 | Haardt et al. |
| 6,334,059 | B1 | 12/2001 | Stilp et al. |
| 6,470,195 | B1 | 10/2002 | Meyer |
| 6,477,161 | B1 | 11/2002 | Hudson et al. |
| 6,501,955 | B1 * | 12/2002 | Durrant et al. ............ 455/456.1 |
| 6,553,322 | B1 | 4/2003 | Ignagni |
| 6,782,264 | B2 | 8/2004 | Anderson |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,922,170 | B2 | 7/2005 | Alexander, Jr. |
| 2002/0094821 | A1 | 7/2002 | Kennedy, Jr. |
| 2003/0083008 | A1 | 5/2003 | Baker et al. |
| 2003/0162550 | A1 * | 8/2003 | Kuwahara et al. ............ 455/456 |
| 2003/0190919 | A1 | 10/2003 | Niemenmaa |
| 2003/0220075 | A1 * | 11/2003 | Baker et al. .................... 455/17 |
| 2004/0043775 | A1 | 3/2004 | Kennedy, Jr. et al. |
| 2004/0147221 | A1 | 7/2004 | Sheynblat et al. |

OTHER PUBLICATIONS

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Stanford University.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thIinternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

* cited by examiner

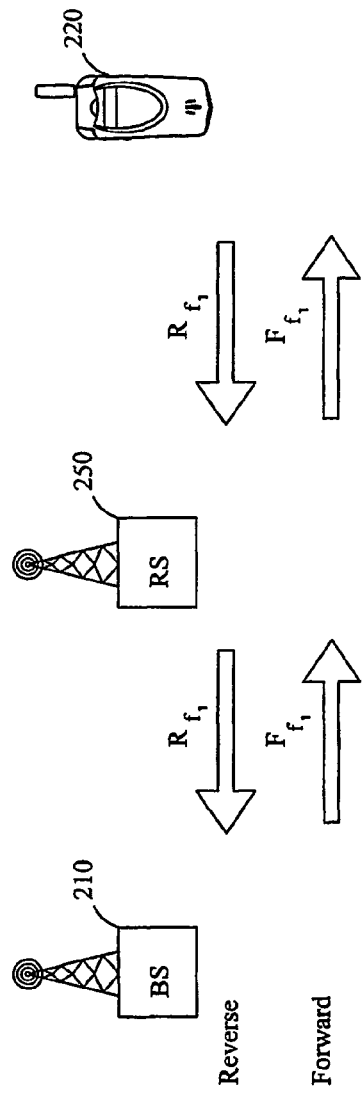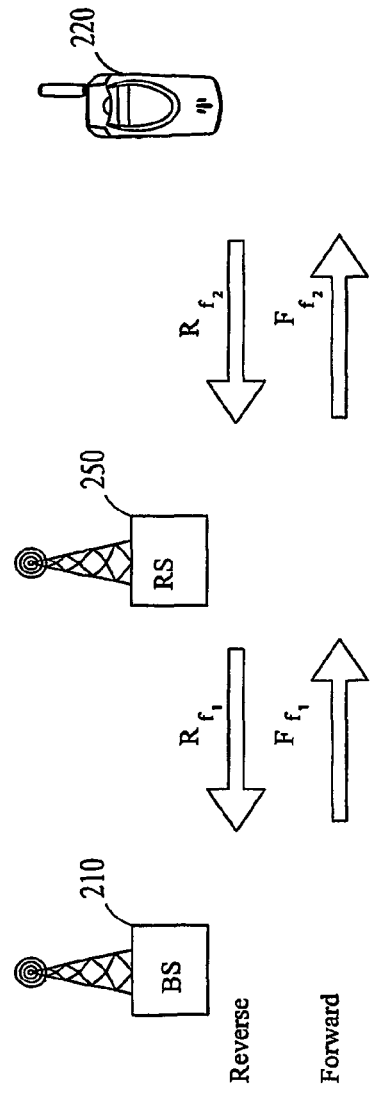
FIGURE 2a (PRIOR ART)
FIGURE 2b (PRIOR ART)

SYSTEM AND METHOD OF OPERATION FOR NETWORK OVERLAY GEOLOCATION SYSTEM WITH REPEATERS

CROSS REFERENCES

The present application claims priority benefit of provisional application entitled "System and Method for Network Overlay Geolocation System with Repeaters in a GSM Network", Application Ser. No. 60/503,490 and filed on 17 Sep. 2003, the entirety of which is hereby incorporated herein by reference.

The present application is related to and co-pending with applications titled "A NETWORK OVERLAY GEO-LOCATION SYSTEM WITH SMART ANTENNAS AND METHOD OF OPERATION" Ser. No. 10/531,040, "A SYSTEM AND METHOD FOR ENHANCING THE ACCURACY OF A LOCATION ESTIMATE" Ser. No. 10/531,044, "NETWORK OVERLAY LOCATION SYSTEM AND METHOD FOR AIR INTERFACE WITH FREQUENCY HOPPING" Ser. No. 10/531,041, "A SYSTEM AND METHOD FOR ESTIMATING THE MULTI-PATH DELAYS IN A SIGNAL USING A SPATIALLY BLIND ANTENNA ARRAY", Ser. No. 10/531,039, and "WIRELESS COMMUNICATION NETWORK MEASUREMENT DATA COLLECTION USING INFRASTRUCTURE OVERLAY-BASED HANDSET LOCATION SYSTEMS" Ser. No. 10/531,042, filed Oct. 16, 2003, the entirety of each of these applications is incorporated herein by reference.

BACKGROUND

Applicant's disclosure is directed generally towards a wireless communications network for determining whether a signal from a mobile appliance is operated on by a repeater thereby further enabling the determination of the location of mobile appliances.

The use of wireless communication devices such as telephones, pagers, personal digital assistants, laptop computers, etc., hereinafter referred to collectively as "mobile appliances", has become prevalent in today's society. Recently, at the urging of public safety groups, there has been increased interest in technology which can determine the geographic position, or "geolocate" a mobile appliance in certain circumstances. For example, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile appliance, i.e., location of roads, dead-reckoning, topography, map matching etc.

In a network-based geolocation system, the mobile appliance to be located is typically identified and radio channel assignments determined by (a) monitoring the control information transmitted on radio channel for telephone calls being placed by the mobile appliance or on a wireline interface to detect calls of interest, i.e., 911, (b) a location request provided by a non-mobile appliance source, i.e., an enhanced services provider. Once a mobile appliance to be located has been identified and radio channel assignments determined, the location determining system is first tasked to determine the geolocation of the mobile appliance and then directed to report the determined position to the requesting entity or enhanced services provider.

The monitoring of the RF transmissions from the mobile appliance or wireline interfaces to identify calls of interest is known as "tipping", and generally involves recognizing a call of interest being made from a mobile appliance and collecting the call setup information. Once the mobile appliance is identified and the call setup information is collected, the location determining system can be tasked to geolocate the mobile appliance.

FIG. 1 shows a conventional mobile-appliance communication system having base stations 10a-c for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through wireline connection 41. A mobile appliance location determining sensor 30 i.e., wireless location sensor ("WLS") may be positioned at some or all of the base stations 10 to determine the location of mobile appliance 20 within the signal coverage area of the communication system.

A network overlay system is generally composed of two main components, one that resides at the base station that makes measurements on the RF signal emanating from the wireless device, the WLS 30, and one that resides at the mobile switch that tasks the WLS groups to collect data and then uses the data to compute a location estimate, this latter component is generally referred to as the Geolocation Control System ("GCS") 50. In the normal course of operation, the GCS is tasked by an outside entity, e.g., the Mobile Positioning Center ("MPC") 40, to generate a location estimate on a particular mobile appliance. The tasking is accompanied by information on the mobile of interest including the serving base station and sector for the call and the RF channel (frequency, time slot, CDMA code, etc.) being used by the wireless communications network to complete the wireless connection. Once the GCS receives this tasking, based on the serving sector, it tasks a set of WLS units to make measurement on the RF emission of the mobile. The WLS units make the measurements, and report them to the GCS. The GCS then computes a location estimate using some mathematical or data matching algorithm. Alternatively, control signaling on RF or wireline interfaces used to set up calls in the wireless network can be scanned to detect the placement of a call of interest. The signaling that occurs on the RF control channel can be used to determine location, or call setup/channel assignment parameters can be extracted from the control messaging to determine which traffic channel to use for location related measurements.

Network overlay location systems typically locate a mobile appliance on the traffic channels of a wireless network. The system typically uses sensors employing techniques of time difference of Arrival ("TDOA") supplemented with Angle of Arrival ("AOA") in some case to perform a multi-site location computation. The traffic channel assignment information is provided through a separate process, with one option being a wireline interface providing MOBINFO (IS-41 Mobile Information) parameters passed by the Mobile Positioning Center as part of the GPOSREQ (J-STD-036 Geolocation Position Request) message from the MPC to the GCS 50.

To meet the ever growing demand for mobile communication, wireless communication systems deploy repeater stations to expand range and concentration of coverage. In FIG. 1, a repeater 50a, associated with base station 10a, is located to extend the coverage area to encompass the back side of the mountain 1. The repeater 50b, associated with base station 10c, is mounted on a building and is used to provide service within the building 2.

Repeaters typically fall into two categories: (1) non-translating, also known as wideband, and (2) translating, also known as narrowband. As shown in FIG. 2a, non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MPC, and the base station controller. As shown in FIG. 2b, the translating repeater uses the base station traffic channel $R_{f1}$, for repeater 250 to base station 210 communication while the mobile appliance 220 utilizes a separate frequency $R_{f2}$ for mobile to repeater communications. Translating repeaters act similarly in the forward direction using $F_{f1}$, from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

Let the set of signals transmitted by N mobiles in the repeaters input bandwidth be denoted by $$S(t) = \sum_{k=1}^{N} a(k)x(k,t)\sin(wt),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k,t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k,t)\sin(vt)\cos(wt-vt) + G\sum_{k=1}^{N} a(k)x(k,t)\cos(vt)\sin(wt-vt),$$

in which G is the repeater gain. The last equation can be written in a more convenient mathematical manner by noting that R(t) can be derived from D(t) by writing it as R(t+T)= Re{G exp(j(w−v)tI(t))}, where G exp(j(w−v)t) is the complex representation of the multiplicative signal introduced by the repeater on the downshifted signal bandwidth and I(t) is the complex representation of D(t).

The parameter T is the repeater delay. In the description, there are two "configurations" referred to and discussed. Configuration 1 describes the scenario where repeaters are installed in the network with whatever inherent delay is present when designed and manufactured. In other words, these repeaters have a known repeatable delay that may not be set or selected. In configuration 2, it is assumed that the repeater delay can be selected (it is still known and repeatable), and that the delays for different repeaters operating on the same sector can have settable different delays.

This delay T is fixed in both configurations. In configuration 2 it is also held fixed, though the repeater is required to be able to change the delay if necessary. It is envisioned that configuration 2 will use larger delays than configuration 1. An advantage of having selectable delays will become apparent in the detail description Essentially, the function of the repeater is to convert the RF signal to an IF signal, delay and amplify that IF signal, up-convert the signal back to RF and transmit the signal. This is true for both translating and non-translating repeaters.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater, and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater is serving a call. Therefore the GPOSREQ information from the MPC which, in part, originates from the switch, is not able to alert the Geolocation system that a repeater is in use. When a prior art network overlay location system attempts to locate a mobile being served by a repeater without knowing that a repeater is serving the mobile, a number of alternatives can occur. The location system may locate the mobile based on receiving only RF signals directly from the mobile at a sufficient number of sites to locate the mobile. This alternative is the same as if the repeater was not involved from the standpoint of the location system. Another alternative is that the location system would receive signals from the repeater backhaul link antenna, and produce a location. Thus, the location of the repeater antenna (rather than the mobile) would be the "worst case" geolocation computed location.

For example, a repeater installed as an in-building distribution system would use indoor antennas to communicate with the indoor handsets, and an outdoor antenna to communicate with the host base station. If the geolocation system were unable to locate the mobile itself, the location of the outdoor antenna (the repeater) would be used. Since this is the location of the building housing the mobile, this is a much better location estimate than the Phase I cell-sector information and is often compliant within the FCC accuracy mandate over the given network. The Phase I system typically does not know of repeater existence and uses the host cell's cell-sector information for location. While acceptable in some cases, as identified above, using the location of repeater 50*a* in FIG. 1, would be of little use. In the case where the location system receives the RF signal from a mixed set of sources, (some from the mobile and some from the repeater backhaul antenna), an erroneous location estimate can be generated. If only one signal is received, its path (either through the repeater or direct propagation) must be determined to calculate an accurate location estimate. If the wrong assumption is made, the large delay through the repeater wrongly applied can add large errors to the TDOA surfaces and intersection points. In the case where the location system does not receive RF at sufficient WLS sites to generate a location estimate due to the effects of the repeater action or transmitted power of the mobile or directionality of the repeated signal from the repeater backhaul antenna, no location estimates will be reported.

Therefore, there is a need in the prior art for a network overlay geolocation system and method of operation in a host wireless communication system that provides accurate geolocation of mobiles served by repeater stations. In order to accomplish this, there is a need to overcome the deficiencies in the prior art by employing a novel geolocation system and method that is capable of identifying when a mobile's signal is being received via a repeater.

In view of this need, it is an object of the disclosed subject matter to obviate the deficiencies in the prior art and present an improved method for determining the location of a mobile appliance in a wireless communication system with base stations and a repeater for communicating with the mobile appliance.

It is also an object of the disclosed subject matter to present a method for determining whether a signal is received directly from the mobile or from a repeater in the communication network.

These objects and other advantages of the disclosed subject matter will be readily apparent to one skilled in the art to which the disclosure pertains from a perusal of the claims, the appended drawings, and the following detailed description of the preferred embodiments.

BRIEF DESCRIPTION OF THE DRAWINGS

FIG. 2*a* is an illustration of the operation of a prior art non-translating repeater station.

FIG. 2*b* is an illustration of the operation of a prior art translating repeater station.

DETAILED DESCRIPTION

Figure 1:
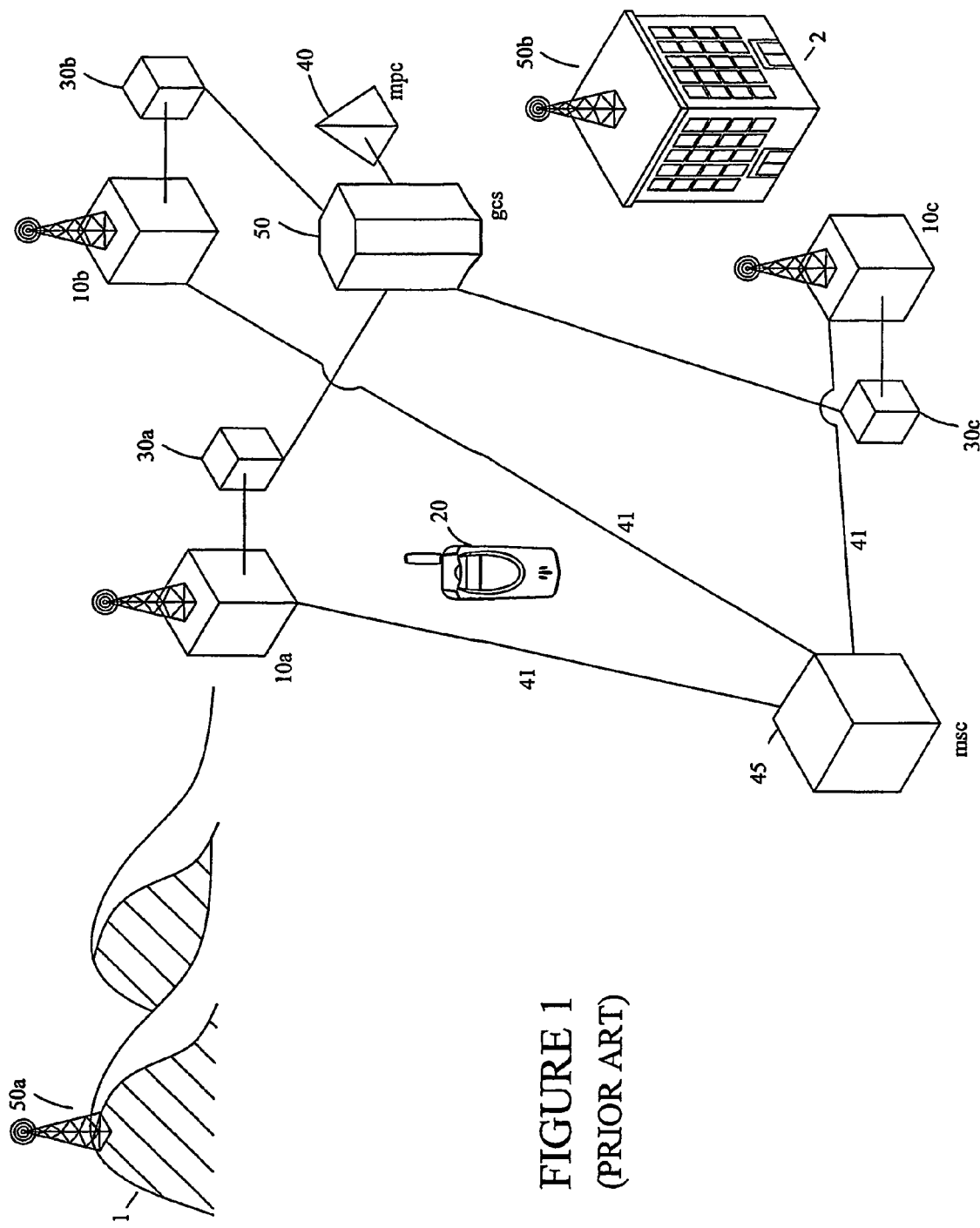
FIG. 1 is a prior art wireless communication system with a network overlay geolocation system.
Figure 3:
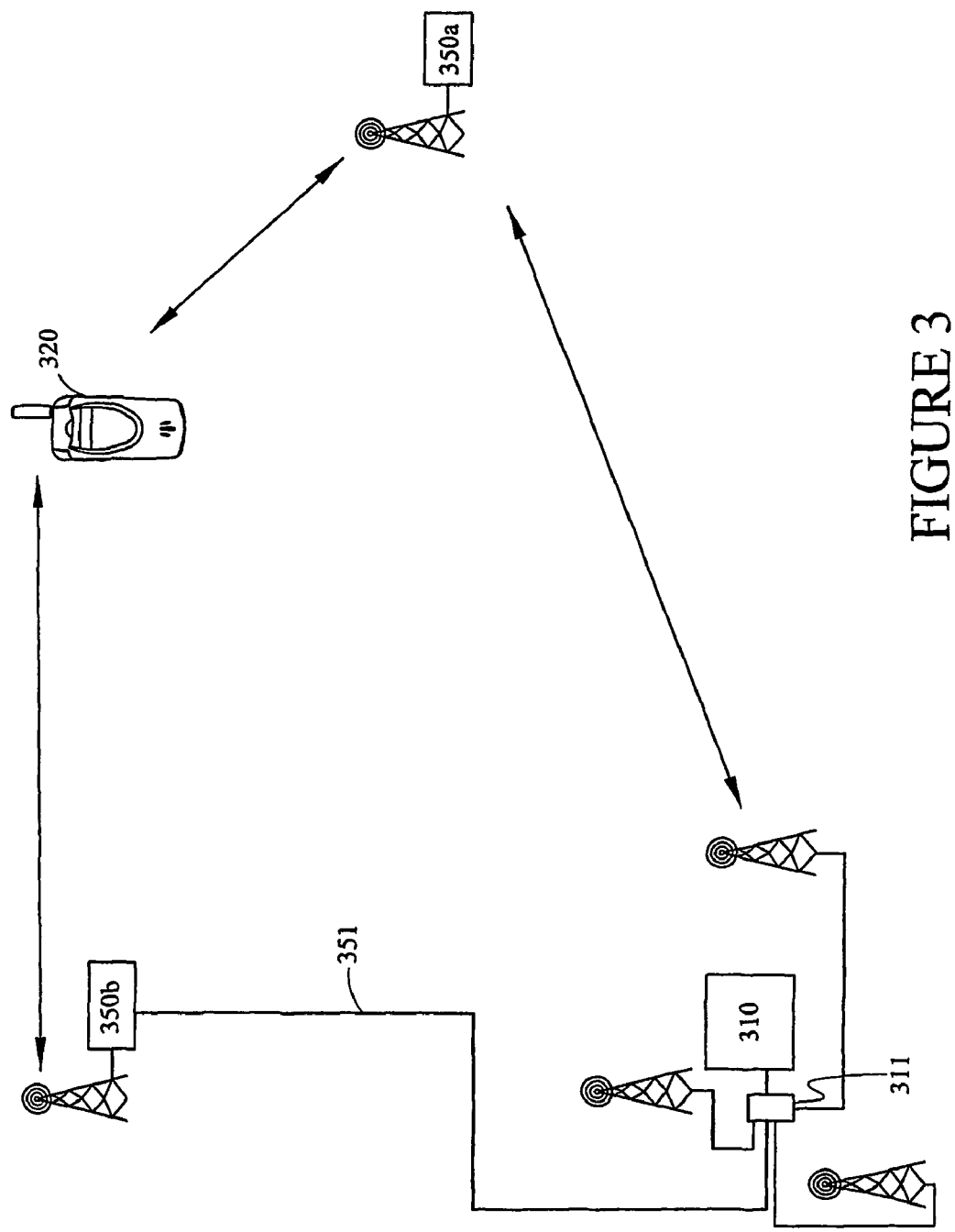
FIG. 3 is an illustration of a prior art wireless communication system with repeater stations connected with an RF link and over a tether.

An important aspect of the presently disclosed subject matter is that the geolocation system can determine when a received signal from a mobile has passed through a repeater. Prior art systems do not have this capability and consequently treat all the signals received by the geolocation system as having been received directly from the target mobile. For example, the ability to determine if a signal from a mobile has passed through a repeater enables embodiments of the disclosed subject matter to determine in some instances (a) at least a default location of a mobile (e.g., at the repeater) where the prior art could determine no location at all, and/or (b) a location of the mobile where the prior art may return a location with large errors. The foregoing are exemplary only and shall not be used to limit the invention. These examples and others are discussed in more detail below.

The ability to discern the difference between direct signals and repeated signals (i.e., signals that arrive via a repeater) allows the geo-location system to better determine a location for the mobile. There are two categories of information that can be used to make the determination of whether the signals received by the location system sensors propagate directly from the mobile appliance, or through a repeater. The disclosed subject matter includes using either category by itself or in combination with the other.

The first category is a parameter measured by the GSM network called Timing Advance (TA). It can be used to determine a crude range for the mobile from a base station. Measurements made by the location system for range can be compared to the TA estimate to determine if the propagation path is direct or through the repeater. The other category of information is composed of ancillary data and includes the "hearability" of neighbor Broadcast Common Control Channels (BCCHs) and transmitted power level to hypothesize the likely path.

Timing Advance

In a GSM system, for example, the mobile is expected to transmit three time slots subsequent to receiving data from the base. If there were no propagation delay, the mobile transmission then arrives in a certain time window that excludes arrivals from other mobiles. As the mobile moves further away from the base, if no adjustment were made for the finite propagation delays on the transmissions in both directions, the mobile transmissions of distinct mobiles could and likely would overlap in time. This overlap causes undesirable interference. A resolution to this problem is derived by forcing the mobile to transmit with an attributable delay (a time advance "TA") commensurate with the propagation delay. In GSM systems the base transmits a TA parameter to the mobile appliance. The TA parameter is the time by which the mobile needs to advance its transmission so that the base can avoid inter-mobile interference in time due to varying propagation times.

The base station computes and adjusts the TA parameter so that the mobile transmission falls into a desirable location in the time domain. Ideally, the TA parameter adjusts exactly for the round trip propagation delay. The current value of the TA parameter is transmitted to the mobile within the layer 1 header of the Slow Associated Control Channel (SACCH). In addition the BTS transmits the applied TA value to the BSC within the MEAS_RES message. Of course other methods of managing and disseminating the TA are envisioned and are not meant to be precluded from operation with the disclosed subject matter.

An exemplary TA parameter can be set in the integer range 0 to 63 which corresponds to time increments of (48/13) microseconds over the interval 0 to 232 microseconds. The steps are hence of the order of 1100 meters of resolution, and the maximum TA value corresponds to where the one way propagation delay for the mobile is equivalent to a radial distance of approximately 35 km from the base for the exemplary GSM system described. Throughout the disclosure, time and distance will be used interchangeably with reference to the propagation delay, this usage is with the understanding that $\tau(time)=R(dist)/v(velocity)+\tau_c$ where for a given frequency $v$ is constant and easily determinable and $\tau_c$ is a constant.

The propagation time from the base to the mobile is: $T_{bts-ms}=\tau_p+\tau_r$ where $\tau_p$ is delay due to propagation of the signal over a distance and $\tau_r$ is the delay due to passing the downlink through the repeater. As is known in the art, repeaters add some time delay to the mobile signal, whether the repeater is translating or non-translating, tethered or untethered (sometimes referred to herein as RF Backhaul). The delay arises from the fact that the repeater receives a signal from the mobile, reproduces (or translates) and amplifies the signal, and then transmits the signal to the base station. Where the mobile's signal is not engaging the use of a repeater, $\tau_r=0$ and thus $T_{bts-ms}=\tau_p$, however for purposes of clarity the delay due to a repeater is included hereinafter.

The propagation time from the mobile to the base is: $T_{ms-bts}=\tau_p+\tau_r-TA+\delta$ where TA is the timing advance and where $\delta$ is a constant time delay where the BTS expects the mobile to appear relative to the forward link timing The total round-trip signal propagation time is therefore $T_{bts-ms-bts}=2\tau_p+2\tau_r-TA+\delta$.

The BTS attempts to set TA such that it cancels out all channel delays so that $T_{bts-ms-bts}=\delta$. Therefore making the time between forward link and the reverse link independent of propagation delay.

If the position of the BTS and repeater is known, and the delay through the repeater is known, then a candidate TA can be derived that would be used by the BTS if the mobile were passing through the repeater. This derivation embracing the assumptions that the repeater's area of coverage is generally limited and much smaller than the coverage of the serving cell or cell sector Thus if $T_{bts-ms-bts}=\delta$ then the timing advance for the repeater $TA_r$ can be solve as $TA_r=2\tau_p+2\tau_r$.

If the mobile were passing through a repeater, then its assigned timing advance TA should be close to $TA_r$. If it is not close to $TA_r$, then it can be assumed it is not passing through the repeater; against this assumption is predicated on the coverage area of the repeater being limited.

The repeater equivalent distance is the distance at which a mobile should be located so that the propagation time from the base to this mobile is one half of $TA_r$. Thus the repeater equivalent distance (measured in units of time) is:

$\tau_p+\tau_r$

This is the distance (measured in units of time) from the base station at which a transmitting non-repeated mobile may have the same TA value as a mobile at the repeater.

In the performance of the above described method, some factors are directly related to the effectiveness of determining whether the signal is received directly or through (via) a repeater.

(1) The reliability of the method of identification is subject to the accuracy with which the base station (and/or the cellular system) computes and transmits various signaling and measurement parameters.

(2) The reliability of the method of identification is dependent on the number of repeaters that need to be identified in the cell or sector. Part of this invention is the ability to determine which repeater the mobile propagates through by knowing the delays through each repeater, and assigning a different delay (different enough to be measurable by the location system sensors) to each repeater operating from a common sector.

(3) The reliability of the method of identification is somewhat dependent on whether AOA is implemented or not at the serving base station. If AOA is implemented this would assist in circumscribing the feasible region for a candidate mobile. In addition a loose fix may be computed using the TA parameter.

(4) The reliability of the method of identification is dependent on characteristics of the repeated location. These characteristics include the degree of isolation at the repeated location and the amplification at the repeater. More isolation and greater amplification will enhance the reliability.

(5) The reliability of the method of identification is dependent on the magnitude of the repeater delay. Large delays allow for greater discrimination between a repeated and non-repeated mobile. Thus the largest practically feasible delays are desirable.

(6) The reliability of the method of identification is subject to the reliability with which the mobile implements the TA parameter. If the mobile implements this incorrectly, the base station may transmit invalid TA values which would impact the repeater identification algorithms.

In configuration 1 the repeater delay is known but is not variable. No modifications are needed at the repeater and no ranges are required on any parameters.

In configuration 2, the repeater delay parameter T should have the capacity to be variable; for example only, in the range 6 microseconds to 232 microseconds. Each repeater is assigned a different value of T. This is in accordance with our previous assumption that the high probability scenarios associated with the use of a repeater are those listed as (1) and (2) in the following section. That is, we assume that with high probability when a repeater is used, the unrepeated mobile signal is not often observable at the base.

If the unrepeated mobile signal is also heard at the base while the mobile is in the vicinity of the repeater, the applied range of T may have to be reduced considerably due to equalizer constraints, resulting in a corresponding deterioration in the probability of repeater identification. If not, it is conceivable that a call in progress while the mobile is outside the repeater location may not be maintained when the mobile is at the repeater location. Thus, it may be necessary in some cases to limit the actual repeater delay applied, for example, to less than 16 microseconds, possibly down to 12 microseconds.

Hearability

The other category of information as alluded to above is hearability. Hearability is defined by the signal being received at a Signal to Noise Ratio (SNR) high enough to be detected using the normal demodulation and decoding operations at the Base Station (BS) or associated receivers.

It terms of hearability, it is usefull to attempt a classification of the scenarios that may arise associated with implementation of a repeater within a GSM cell/sector. The scenarios that may be considered are as follows:

(1) Only the repeated signal is heard at the serving site. Neither the repeated signal nor the unrepeated signal can be heard at any other site.

(2) Only the repeated signal is heard at two sites—the serving site and one other site.

(3) Both the repeated signal and the unrepeated signal are heard at the serving site and at no other sites.

(4) Only the repeated signal is heard at more than two sites. In this scenario the location of the repeater can be determined by the un-enhanced geolocation system, since the time delay of the repeater cancels out during TDOA calculations.

(5) Both the repeated signal and the unrepeated signal are heard at two sites.

(6) The repeated signal and the unrepeated signal are heard over some collection (>2) of sites. Some sites hear both signals, some only one or the other.

(7) Only the unrepeated signal is heard at a collection of sites.

These scenarios are listed in order of decreasing probability: given that a mobiles call is in fact being amplified by a repeater, it is expected that scenarios (1) and (2) are of much higher probability than any of the others. Thus the method indicated here is heavily weighted towards a solution for scenarios (1) and (2). It is important to note that for tethered repeaters the use of a repeater can be determined simply on the existence of the mobiles signal on the tether.

Embodiments of the present subject matter used by the network overlay geolocation system signal processing to determine whether a particular mobile is served/located at the repeater are based on the following:

a) The applied TA parameter for the transmission. A determination or reception of the TA permits a computation of the radius about which the mobile is likely located b) How many and which sites hear the transmission. Identification of which sites receive the signal, permits a determination of the likely location of the mobile such as through triangulation or common coverage areas.

c) The power level at which the mobile is transmitting. The GSM mobile is required to transmit the current power level used in the SACCH layer 1 header on each uplink channel. The power level dissipates as a function of approximately the distance squared ($1/D^2$). Therefore, knowledge of the power level of the transmitting mobile and the power level of the received signal, an approximation of the distance between the BTS and the mobile appliance can be obtained, thus permitting an evaluation of whether it is possible for a mobile located via (a) to be heard with the power level used in (c).

d) In the case of multiple site hear-ability the location/loci at which the existing network overlay geolocation system location algorithms places the mobile allows refinement of the mobile location which is contrasted against the radius derived in (a).

e) The mobiles measurements of how well the mobile can hear the serving cell and the strongest BCCHs (Base station Common Control Channels) of neighboring cells. These are derived from the Measurement Report (MMR) parameters transmitted by the mobile to the BTS on the SACCH and permit an evaluation of the type of environment in which the mobile is located and also permits an alternate region of location.

f) The locations and applied delays for the set of repeaters allows for refinement of the mobile location which is contrasted against the radius derived in (a).

The implemented embodiments are detailed later, however the following example used hear and throughout the remainder of the description provides an illustration of the flavor of the approach but is not intended to limit the subject matter to the specific values or scenarios associated with the illustration.

Figure 4:
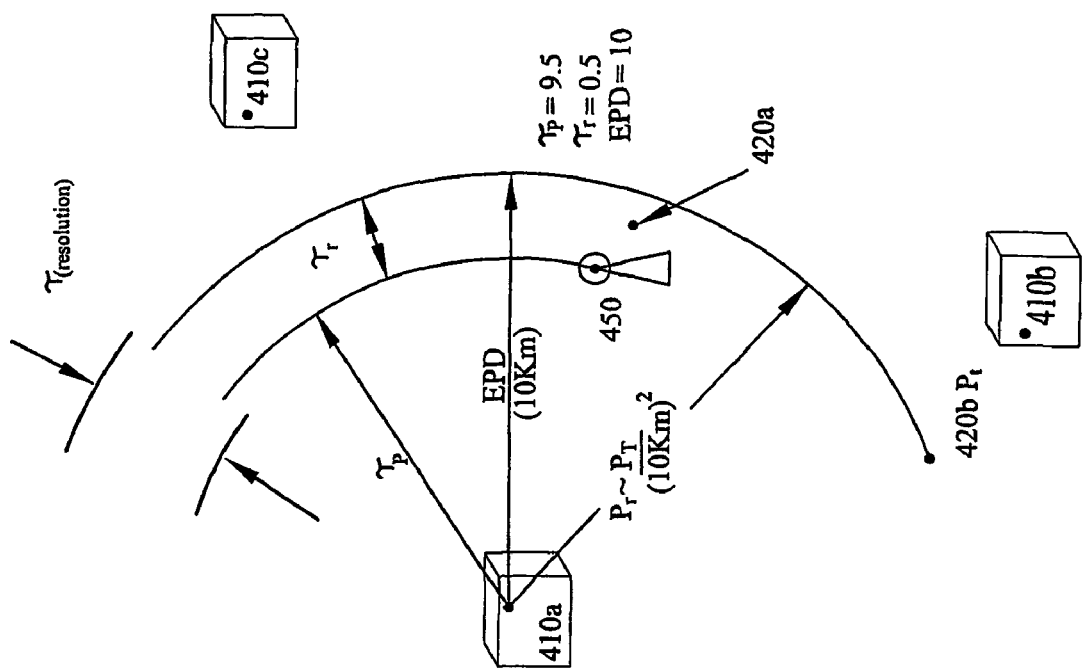
FIG. 4 is an illustration of a mobile served by a repeater and a mobile served directly by a base station in a wireless communication system according to an embodiment of the present subject matter.

For example, consider a scenario where the TA parameter corresponds to 20 km. If this mobile was being amplified by a repeater 450, that repeater must then have an equivalent propagation distance (EPD) (the base to repeater distance $\tau_p$ plus the repeater delay $\tau_r$) of 9.5 km+0.5 km=TA/2=10 km as shown in FIG. 4. From (a) above, the first step would be to evaluate whether any of the repeaters are a possible candidate. Assume that repeater R 450 is a candidate, since it is located at an equivalent distance 10 km from the base station 410a. In order to determine how likely is the hypothesis of an unrepeated mobile transmitting from that distance versus a mobile served by repeater R 450 several factors are considered. Examining the transmitted power level of the mobile, as in (c), is it conceivable that a mobile located 10 km from the base at 420b and not repeated can transmit at this level and be heard at the base at the observed power? Examining how well the mobile hears the BCCHs of other cells such as base station 410b, as in (e), is it expected that a mobile at the repeater location at 420a can hear the transmissions of those cells 410a, 410b and 410c and hear them at the observed levels? If the mobile is actually 10 km away, at location 420b, is it likely that it is being served by this cell 410a rather than a much closer cell 410b? If multiple sites 410a, 410b and 410c or other cells hear the mobile? Where does the un-enhanced standard location system processing place the mobile? How well does the mobile environment (all data associated with the mobile) fit data derived for test mobiles at the repeater locations? These are all factors that can be compared and used to determine a likely hypothesis.

In implementing embodiments of the subject matter with the above example, weights can be applied to the hypotheses and their correlations with each other. An aggregate weight can be computed for the two final hypotheses:

The first hypotheses (H1): The transmission is from an unrepeated mobile at distance TA/2 (10 km).

The second hypotheses (H2): The transmission is from a repeated mobile at the location of repeater R with EPD distance of TA/2 (10 km).

The hypothesis with higher weight is declared by the wireless communication network or the network overlay geolocation system to be the accepted hypothesis. If H1 is accepted, the mobile is located using the un-enhanced network overlay geolocation system location algorithms. If H2 is accepted, the mobile is located at repeater R.

Clearly if the TA parameter does not fall into a region of ambiguity associated with the set of repeater delays (the uncertainty, for example being about 550 meters as shown in FIG. 4) the hypothesis H2 may be rejected without any further consideration, since no candidate repeater would be available. Probability bands of resolution may be more appropriate in scenarios where the time of propagation from the mobile to the repeater is not much less than the time of propagation from the repeater to the base station, such that $\tau_p \gg \tau_{p(mobile-repeater)}$.

Note that (1) the ability of the base to accurately (within the 1100 meter uncertainty) compute the TA parameter, and, (2) to a reduced extent, the ability of the mobile to accurately implement the timing advance, are essential for the successful implementation of the disclosed approach.

Embodiments of the disclosed subject matter use a plurality of evaluations to provide the probability of one hypothesis or another. An embodiment assigns a quantitative value between 0 and 10 to represent each of the following events, however other quantitative measures are also envisioned.

Figure 5:
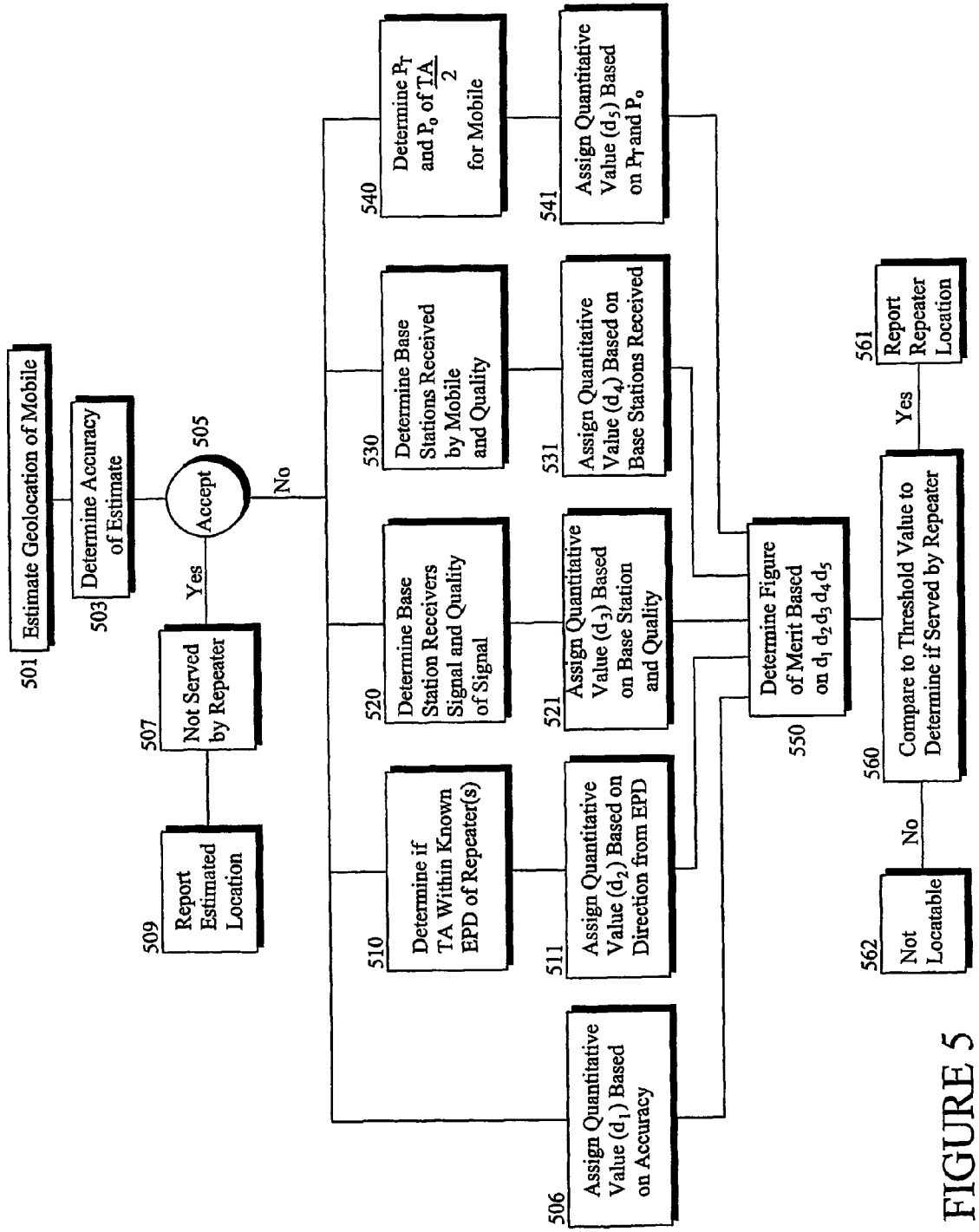
FIG. 5 is a schematic representation of a method for determining the location of a mobile operating in a wireless communication system with repeaters according to some embodiments of the present subject matter.

FIG. 5 is a schematic representation of an embodiment of the disclosed subject matter, where the wireless communication network has an attendant network overlay geo-location system. In FIG. 5 the difference factors are determined in parallel, however it is also envisioned the factors can be determined in series and no limitation of scope should be prefaced on the parallel representation of FIG. 5. Additionally, more or less factors can be considered and the discussions and representation of the factors in FIG. 5 do not preclude others or require all the factors to be present.

In a wireless communication system with a network overlay geo-location system, a signal form the mobile is received and an attempt is made to estimate the geo-location of the mobile as shown in Block 501. With the estimated location, the wireless communication system determines the Circular Error Probable (CEP) for the location computed using the preexisting network overlay geo-location system signal processing algorithms as shown in Block 503. CEP refers to the radius of a circle in which 50% of the values occur, i.e. if a CEP of 100 meters is quoted then 50% of absolute horizontal point positions should be within 100 meters of the true position (with this notation CEP is R50). For most positioning applications 50% is rather too small a probability to be useful and a higher percentage is more valuable, typically 95% is often quoted and the term R95 used. The CEP is compared to an accuracy threshold as shown in Block 505. If the CEP is within acceptable limits the system determines the signal has not been operated on by a repeater as shown in Block 507 and the estimated location is reported as the mobile location as shown in Block 509. If the CEP or other accuracy measurement is not within the acceptable threshold, a quantitative value is assigned based on the accuracy measurement as shown in Block 506.

For example, the quantitative value (number) 10 is assigned if no fix can be computed by the wireless network or geo-location system due to lack of site hearability (i.e. low CEP value), the number 0 is assigned if the fix can be computed and has excellent CEP. The lower the number the higher CEP vale or other measure of geo-location accuracy. If the assigned number is 0, the fix can be reported as the mobile location and no further processing may be required. If not, then denoting the assigned number as $d_1$ and proceeding to Block 510.

In block 510, the system determines from the known repeater locations $\tau_p$ and corresponding repeater delays $\tau_r$, whether the reported TA value fits a repeater window. The repeater window is the region of ambiguity associated with the resolution used in reporting the TA parameter, as shown previously in FIG. 4. Given a particular repeater, the expected TA for that repeater can be calculated. The repeater window is this TA value plus or minus the resolution. Based on TA values and corresponding repeater windows and resolution the system in Block 511 assigns a quantitative value for example the number 10 if the TA value fits such a window and smaller numbers depending on how far off the TA parameter is from the repeater window. Again data stored in the network overlay geolocation system for test mobiles located at the repeater location may be used to enhance this determination. The system denotes the assigned quantitative value as $d_2$.

In block 520, the system determines how well the mobile 420 is heard at base stations inclusive of and adjacent to the serving base station, such as base stations 410a, 410b and 410c. As illustrated in FIG. 4, from this determination, the system assigns a quantitative value as shown in block 521, such as the number 10 if the mobiles signal is heard only at the serving base station 410a and lower quantitative number if the mobile is heard at other base stations 410b, 410c or others also. This quantitative value is denoted as $d_3$.

The system determines how well the mobile hears the serving base station 410a in block 530. Based on the determination, the system assigns a quantitative value as shown in block 531 such as the number 10 if the mobile hears the serving base exceptionally well and does not hear any other base stations. This is evident of repeater used, since as described previously the repeater amplifies both the uplink and downlink signals. The system assigns the number 1 if the mobile hears other base stations nearly as well and intermediary numbers depending on the strength at which the mobile hears other base stations. This quantitative values are denoted as $d_4$. Data stored in the network overlay geo-location system for test mobiles located at the repeater location may again be used to enhance and modify this determination.

In block 540, the system computes the TA equivalent distance for the mobile 420. Given the mobiles transmit power $P_T$ and the know equivalent distance, the system computes the likelihood that a mobile at that distance (and possibly also constrained using other information such as Angle of Arrival (ADA) or a solitary location hyperbola derived from when two sites can hear the mobile) can be heard by the serving base station 410a with the observed power $P_O$. The more accurate the relationship $P_O \cong K^{P_T}/_{D^2}$, the more likely the received signal is directly from the mobile. $P_T$ and $P_O$ are obtainable by the wireless network or geo-location system. On this determination, a quantitative value is assigned in Block 541, for example the number 10 if this event is highly unlikely and the number 1 if the event is likely. The quantitative value is denoted as $d_5$.

If a fix with good CEP exists, no further computations are needed and the mobile is located at that fix location. If not, a figure of merit W, based on one or more of the quantitative values in addition to other quantitative values chosen by the network operator, can be computed as shown in Block 550. One figure of merit, shown for example only, can be derived from $M=5\sqrt{d_1 d_2 d_3 d_4 d_5}$. This figure of merit can be compared to one or more thresholds as shown in Block 560. If M is greater than a threshold H (for example the number 9) the hypothesis that the mobile is located/served by the repeater is accepted as shown in Block 561, specifically the repeater location derived in (2). If M is lower than H, the hypothesis that the mobile is not located/served by a repeater, but since no geo-location fix was possible the mobile is declared as un-locatable as shown in Block 562.

Figure 6:
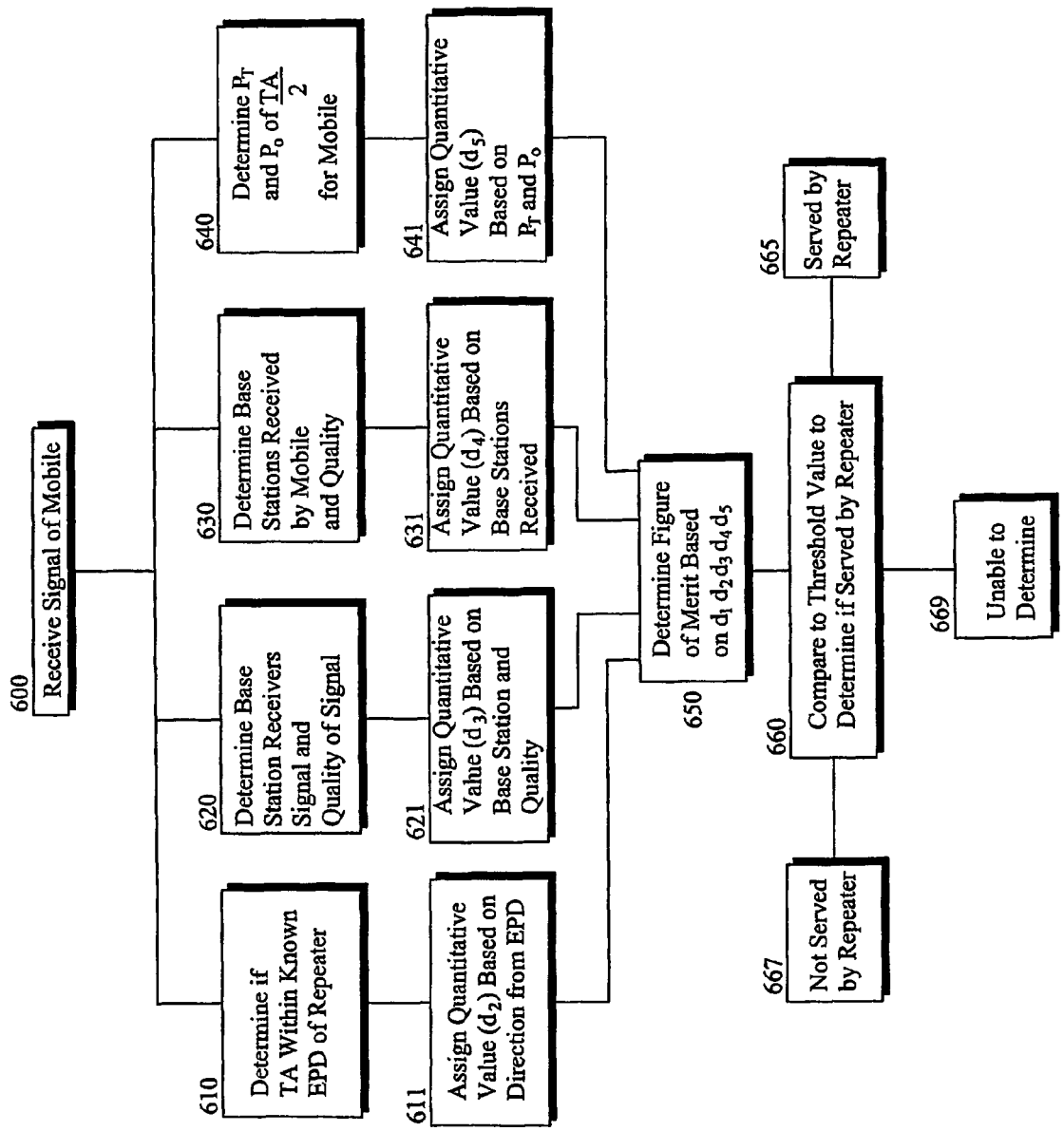
FIG. 6 is a schematic representation of a method for determining if a mobile is being served by a repeater in a wireless communication system with repeaters according to some embodiments of the present subject matter.

Other embodiments implemented in wireless communication networks operate independently of the networks geolocation processing. FIG. 6 is a schematic representation of an embodiment in which the location processing if exists is not used in the determination of whether a received mobiles signal is operated on by a repeater. The communication system receives the signal of the mobile appliance as shown in Block 600. The reception of the signal can be accomplished by the communication system through any number of receiver devices.

In block 610, the system determines from the known repeater locations $\tau_p$ and corresponding repeater delays $\tau_r$, whether the reported TA value fits a repeater window as described previously. Based on TA values and corresponding repeater windows and resolution the system in Block 611 assigns a quantitative value denoted as $d_2$. As describe previously data stored in the network overlay geo-location system for test mobiles located at the repeater location may be used to enhance this determination.

In block 620, the system determines how well the mobile 420 is heard at base stations inclusive of and adjacent to the serving base station, such as base stations 410a, 410b and 410c. From this determination, the system assigns a quantitative value in block 621, as described previously, and is denoted as $d_3$.

The system determines how well the mobile hears the serving base station 410a in block 630. Based on the determination, the system assigns a quantitative value as shown in block 631 and denotes as $d_4$.

In block 640, the system computes the TA equivalent distance for the mobile 420 and the likelihood that a mobile at that distance can be heard by the serving base station 410a with the observed power $P_O$. On this determination, a quantitative value is assigned in Block 641 and denoted as $d_5$.

In Block 650 a figure of merit W, based on one or more of the quantitative values in addition to other quantitative values chosen by the network operator, can be computed. This figure of merit can be compared to one or more thresholds as shown in Block 660. If M is greater (or some defined relationship) than a threshold H the hypothesis that the mobile is located/served by a repeater is accepted as shown in Block 665. If M is lower (or has some other predefined relationship) than another threshold I, the hypothesis that the mobile is not located/served by a repeater as shown in Block 667, but if the figure of merit is in some zone of ambivalence such as less than H but greater than B, the system is unable to determine within a set probability whether or not the signal is served by a repeater, the system reflect this in Block 669.

It will be useful to compare prior art systems with systems operating in accordance with the present subject matter. As will be shown below, the inability of the prior art to determine if a mobile's signal has been received via a repeater may result in severe errors in the geolocation estimate. The following Table 1 indicates what a typical prior art system will output since the prior art is incapable of determining the presence of a repeater in a wireless communication system. It will be understood by those of skill in the art from Table 1 that the only location information is derived from a target mobile's signal:

TABLE 1

| | Scenario | Non-Translating Repeater | |
|---|---|---|---|
| | | RF Backhaul | Tethered |
| (1) | GCS Receives Measurements from Target Mobile Only: | | |
| | (a) <3 signals received | No geolocation determined | No geolocation determined |

TABLE 1-continued

| | Scenario | Non-Translating Repeater | |
|---|---|---|---|
| | | RF Backhaul | Tethered |
| | (b) ≧3 signals received | Determine geolocation of mobile | Determine geolocation of mobile |
| (2) | GCS Receives Measurements from Repeater Only: | | |
| | (a) <3 signals received | No geolocation determined | No geolocation determined |
| | (b) ≧3 signals received | Determine geolocation of repeater | Determine geolocation of repeater |
| (3) | GCS Receives Measurements from Both Mobile and Repeater: | | |
| | (a) <3 signals received | No geolocation determined | No geolocation determined |
| | (b) ≧3 signals received | Possible large errors in geolocation | Possible large errors in geolocation |

Regarding Table 1 above, it will be noted that only non-translating repeaters are shown in Table 1. Table 1 does not include translating repeaters since the prior art has no way of dealing with translating repeaters since the prior art does not, for example, include a mechanism to track the translation of the frequency due to the translating repeater. Therefore, without knowledge of the proper frequency for the mobile, a reported geolocation may actually be based in part on energy not attributable to the target mobile. Consequently, the determined geolocation may be highly inaccurate and the prior art would have no way of knowing that a problem exists.

It will be obvious to those of skill in the art that since the prior art cannot determine if there is a repeater being used in the system, then the prior art cannot determine the difference between signals received directly from the mobile and signals received via a repeater. Therefore, the prior art cannot distinguish between, for instance, Scenario (1)(b), in which the geolocation of the mobile is actually determined and Scenario (2)(b), in which the geolocation of the repeater is actually determined. In both Scenarios, the prior art system will report that the geolocation of the mobile has been determined. Similarly, Scenario (3)(b) is likewise indistinguishable from either Scenario (1)(b) or Scenario (2)(b). However, Scenario (3)(b) will most likely have large errors due to the unaccounted for time delay in the measurement(s) that arrived at the base station via a repeater. Additionally, the prior art can make no determination of geolocation in the event less than 3 measurements are received by the GCS, consistent with the assumption stated above.

The following table, Table 2, indicates what some embodiment of the disclosed subject matter will output when a repeater is operating in a wireless communication system. In this embodiment, there is a known difference in time of arrival between a signal from the target mobile appliance that is received by the geolocation system directly from the mobile and a signal from the mobile that is received by the geolocation system via a repeater.

TABLE 2

| | Scenario | Non-Translating Repeater | |
|---|---|---|---|
| | | RF Backhaul | Tethered |
| (1) | GCS Receives Measurements from | | |

TABLE 2-continued

| | Non-Translating Repeater | |
|---|---|---|
| Scenario | RF Backhaul | Tethered |
| Target Mobile Only: | | |
| (a) <3 signals received | No geolocation determined | No geolocation determined |
| (b) ≧3 signals received | Determine geolocation of mobile | Determine geolocation of mobile |
| (2) GCS Receives Measurements from Repeater Only: | | |
| (a) <3 signals received | Determine repeater location in some instances | Determine repeater location in some instances |
| (b) ≧3 signals received | Determine geolocation of repeater | Determine geolocation of repeater |
| (3) GCS Receives Measurements from Both Mobile and Repeater: | | |
| (a) <3 signals received | Determine repeater location in some instances | Determine repeater location in some instances |
| (b) ≧3 signals received | Determine mobile location in some instances | Determine mobile location |

A comparison of Table 1 (prior art) and Table 2 (an embodiment of the present subject matter) indicates that the present subject matter can determine a useful location for the mobile appliance more often (and more accurately) than the prior art. For example, the prior art for Scenario (3)(a), for non-translating repeaters, cannot determine any location for the mobile. However, Embodiments of the present subject matter can, in some instances, output as the mobile's location the location of the repeater. As discussed elsewhere herein, the location of the repeater typically is within acceptable geolocation parameters.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a wireless communication system having at least one repeater and a geolocation system for determining the location of a mobile appliance by measuring an attribute of the mobile appliance's uplink signal, a method of determining if the uplink signal is received directly from the mobile appliance or via the at least one repeater, comprising:
   estimating the location of the mobile appliance by the geolocation system;
   determining an accuracy of the estimate;
   determining if a Timing Advance (TA) of the uplink signal can be associated with the Equivalent Propagation Distance (EPD) of the at least one repeater,
   determining which receivers have received the uplink signal;
   determining which transmitted signals are received by the mobile appliance;
   determining the relationship between the power of the received signals and the power at which the mobile appliance transmitted the uplink signal;
   determining at least one figure of merit based on two or more of the accuracy of the estimate, the TA of the uplink signal, the equivalent propagation distance, the receivers receiving the uplink signal, the transmitted signals received by the mobile appliance, the power of the received signal, and the power at which the mobile appliance transmitted the uplink signal; and,
   comparing the at least one figure of merit to at least one or more threshold values to determine whether the uplink signal is received directly from the mobile appliance or from the at least one repeater.

2. The method of claim 1, comprising quantifying the accuracy of the estimate; the association of the TA and the EPD; the receivers receiving the uplink signal; the transmitted signals received by the mobile appliance and the relationship of the received power and the transmitted power to the TA.

3. The method of claim 2, wherein the step of determining at least one figure of merit is based on the quantifications.

4. The method of claim 3, wherein the quantification of the accuracy of the estimate is d1, the quantification of the association of the TA and the EPD is d2, the quantification of the receivers receiving the uplink signal is d3, the quantification of the transmitted signals received by the mobile appliance is d4 and the quantification of the relationship of the received power and the transmitted power to the TA is d5; and, wherein the figure of merit is a function of d1, d2, d3, d4, and d5.

5. The method of claim 4, wherein the figure of merit is $M = \sqrt[5]{d_1 d_2 d_3 d_4 d_5}$.

6. The method of claim 1, further comprising selecting the location of the repeater if the uplink signal is determined to be from the repeater as the location of the mobile appliance.

7. The method of claim 1, further comprising selecting the estimate of the location if the uplink signal is determined to be directly from the mobile appliance as the location of the mobile appliance.

* * * * *